United States Patent
Hansen et al.

(10) Patent No.: US 7,043,647 B2
(45) Date of Patent: May 9, 2006

(54) INTELLIGENT POWER MANAGEMENT FOR A RACK OF SERVERS

(75) Inventors: Peter A. Hansen, Cypress, TX (US);
Andrew Brown, Houston, TX (US);
Kevin M. Jones, Tomball, TX (US);
Jeffrey S. Autor, Houston, TX (US);
Andrew C. Cartes, Cypress, TX (US);
Gordon M. Barton, Houston, TX (US);
Michael Sanders, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 985 days.

(21) Appl. No.: 09/966,180

(22) Filed: Sep. 28, 2001

(65) Prior Publication Data
US 2003/0065958 A1   Apr. 3, 2003

(51) Int. Cl.
*G06F 1/13* (2006.01)
(52) U.S. Cl. .................. 713/320; 713/322; 713/323; 713/324; 713/330; 713/340
(58) Field of Classification Search ............. 713/320, 713/322–324, 330, 340
See application file for complete search history.

(56) References Cited

U.S. PATENT DOCUMENTS

| | | | | |
|---|---|---|---|---|
| 5,216,579 A | * | 6/1993 | Basara et al. | 361/683 |
| 5,854,904 A | * | 12/1998 | Brown | 710/100 |
| 6,225,708 B1 | * | 5/2001 | Furukawa et al. | 307/66 |
| 6,483,204 B1 | * | 11/2002 | Hanaki | 307/23 |
| 6,594,771 B1 | * | 7/2003 | Koerber et al. | 713/330 |
| 6,785,827 B1 | * | 8/2004 | Layton et al. | 713/300 |
| 2003/0005339 A1 | * | 1/2003 | Cohen et al. | 713/300 |
| 2003/0023885 A1 | * | 1/2003 | Potter et al. | 713/300 |
| 2003/0037150 A1 | * | 2/2003 | Nakagawa | 709/229 |
| 2003/0112582 A1 | | 6/2003 | Sanders et al. | |
| 2004/0073816 A1 | | 4/2004 | Hansen | |

* cited by examiner

*Primary Examiner*—A. Elamin (57) ABSTRACT

The invention is directed to a system and related method of allocating power in a rack mounted computer system where the individual servers are powered from a central power supply system. The structure includes a series of serial communication pathways coupling the servers and the individual power supplies in the power supply system. A series of chassis communication modules communicates with servers in its respective chassis, and relays messages to and from a power supply communication module, which is responsible for granting or denying permission for individual servers to allocate power. The disclosed system also envisions intelligent de-allocation of power, for example in the event of a failure of individual components of the central power supply system.

28 Claims, 5 Drawing Sheets

INTELLIGENT POWER MANAGEMENT FOR A RACK OF SERVERS

CROSS-REFERENCE TO RELATED APPLICATIONS

This application is related to co-pending application Ser. No. 09/966,650 entitled "Broadcast Compressed Firmware Flashing." This application is also related to co-pending application Ser. No. 10/017,785, entitled "Redundant Data and Power Infrastructure for Modular Server Components in a Rack."

STATEMENT REGARDING FEDERALLY SPONSORED RESEARCH OR DEVELOPMENT

Not applicable.

BACKGROUND OF THE INVENTION

1. Field of the Invention

The present invention relates generally to rack mounted server or computer systems. More particularly, the preferred embodiments of the present invention relate to power control in rack mounted server systems where the power supplies are centralized. More particularly still, the preferred embodiments of the present invention relate to allocation and de-allocation of power in a rack mounted server system having a central power supply system.

2. Background of the Invention

In rack mounted server systems constructed before this invention, each server mounted horizontally in the rack. Thus, observing the front of a previous rack mounted server system, there are a plurality of servers extending from near the bottom of the rack to near the top of the rack, each mounted horizontally.

Each computer or server of previous rack mounted server systems is a stand-alone computer that includes one or more processors, RAM, fixed disks, AC to DC power supplies, and the like. In fact, these servers may have as many as three power supplies within each server such that redundancy is accomplished by having the server operational on only two of those three power supplies. AC to DC power supplies however occupy significant space.

The standard unit of measure for indicating the density of rack mounted server systems is a unit "U" equal to 1.75 inches. Thus, if a computer or server has a 4U density, that server has a thickness of 7 inches. As of the writing of this specification, commercial rack mounted server systems have servers therein with a 1U thickness, where those servers are mounted horizontally in the rack.

In order to decrease server footprint, and thus increase the number of servers that may be placed within a rack, it has been proposed to remove the individual AC to DC power supplies from the servers and place those power supplies at a central location, e.g., near the bottom of the rack. By removing the power supplies from the individual servers within the rack, it is possible to decrease the size of the servers to less than 1U. While removing power supplies and centralizing those supplies within the rack mounted server system may aid in decreasing the footprint of each individual server, this separation of the power supplies from the servers creates problems with regard to how to manage the shared power supply resource, as well as how to allocate and deallocate power during normal and emergency operating conditions.

Thus, what is needed in the art is a way to intelligently control allocation and de-allocation of power in a rack mounted server system with a central power supply system.

BRIEF SUMMARY OF THE INVENTION

The problems noted above are solved in large part by a system and related method that allows the servers to communicate with the central power supply system to implement intelligent power management. In particular, each server of the preferred embodiment couples to a communication module associated with a particular chassis. The server is allowed to communicate to and from that chassis communication module over a serial communication pathway, which in the preferred is an I$^2$C bus. The chassis communication module couples to a power supply communication module associated with the central power supply system. The chassis communication module and the power supply communication module preferably communicate across a serial communication pathway, which in the preferred embodiment is an RS-485 bus. The power supply communication module then preferably couples to each individual power supply in the central power supply system by means of a serial communication bus, which is also an I$^2$C bus. The power supply communication module is preferably capable of monitoring each individual power supply for possible failures and its instantaneous power output.

In the preferred embodiment each server does not fully power on until it receives permission to allocate power from the central power supply system. Permission is derived initially from the particular server requesting permission to allocate power by sending a message across the I$^2$C bus to the chassis communication module. The chassis communication module in turn relays that request to the power supply communication module across the RS-485 bus. The power supply communication module (or the primary power supply communication module, if multiple modules exist) polls each individual power supply (either directly or through a secondary power supply communication module) to determine the total available power of the power supply system. If the server's request to allocate power does not present additional loading beyond a desired operating condition for the power supply system, the power supply communication module sends a message back to the server indicating that permission is granted to allocate power from the system. Once permission is received, the server powers on.

Determining whether a request for power presents more loading than the desired operating condition could be a determination of whether the power requested will so stress the power supply system as to not be operational, but preferably is a determination as to whether the power supply system is capable of supplying that requested power while maintaining fully redundant capability.

There may be multiple power supply communication modules, and there must be some method of determining which of the multiple power supply communication modules will have the primary status. In the preferred embodiment, each power supply communication module has the ability to be the primary power supply communication module, and each has a mechanism for making the determination as to which power supply communication module has that responsibility. This determination is preferably made by having each power supply communication module power up in a secondary mode. Once powered up, each module sends a broadcast message requesting a response from the primary power supply communication module in the system. If no primary power supply communication module exists in the system, no response is received, and if no response is received the power supply communication module self-promotes to primary. Inasmuch as each power supply communication module has this ability, in the preferred embodiment the arbitration for the primary power supply communication module status is effectively won or lost in the arbitration to make the initial communication on the RS-485 bus.

BRIEF DESCRIPTION OF THE DRAWINGS

For a detailed description of the preferred embodiments of the invention, reference will now be made to the accompanying drawings in which.

NOTATION AND NOMENCLATURE

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

Certain terms are used throughout the following description and claims to refer to particular system components. As one skilled in the art will appreciate, computer companies may refer to a component by different names. This document does not intend to distinguish between components that differ in name but not function. The following non-limiting definitions are provided to aid in understanding the preferred embodiments of this invention:

Rack—a rack is a structural system that forms a frame for mounting other devices therein in a rack mounted computer system. The rack could be as simple as a top, a bottom and four corner pieces forming the structure, but may also include decorative or functional coverings around and on those structural components.

Chassis—a chassis is a structure, typically smaller than the overall rack, that is mounted within the rack. In the preferred embodiments of the present invention, individual servers are mounted in the rack mounted system by insertion into the chassis structures. A chassis may alternatively be referred to as a port or an enclosure.

Server—a server is an individual computer mounted within a rack system. Because most computers mounted in rack systems perform server-type operations, throughout this discussion those devices will be referred to as servers. However, the description herein pertains equally to any computer system performing server operations or otherwise.

DETAILED DESCRIPTION OF THE PREFERRED EMBODIMENTS

Figure 1:
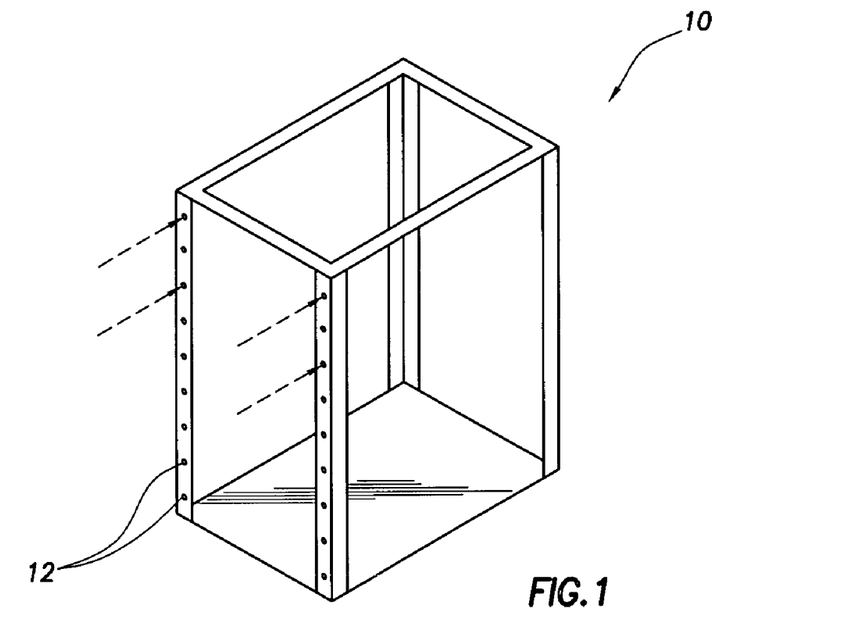
FIG. 1 shows a perspective view of a rack for a rack mounted server system.

FIG. 1 shows a rack 10 for a rack mounted server system. The rack 10 preferably comprises a plurality of structural members which form the frame of the rack mounted system. On a front portion of the rack 10 are a plurality of threaded holes 12 which are adapted to hold various devices within the rack 10.

Figure 2:
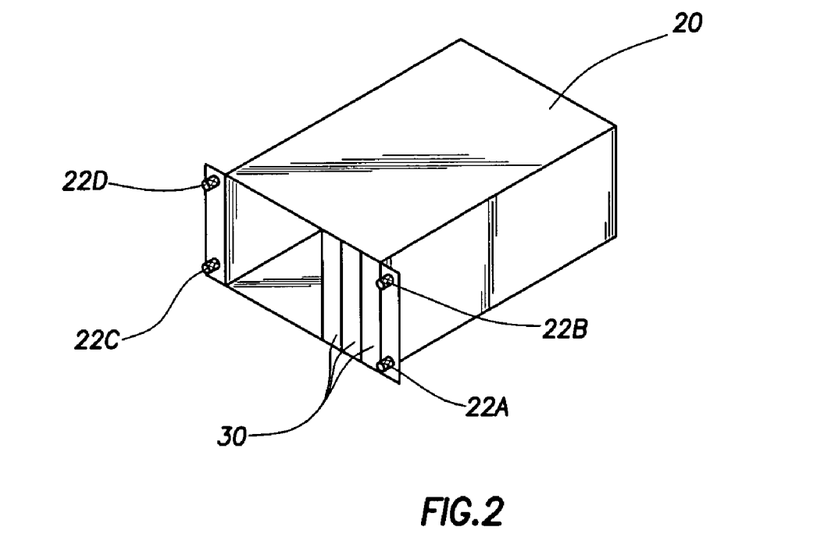
FIG. 2 shows a perspective view of a chassis of the preferred embodiment.

FIG. 2 shows a chassis 20 of the preferred embodiment. The chassis 20 is preferably adapted to slide into the rack 10 and mount at any particular location by use of the knurled knobs 22A–D. These knurled knobs preferably have a threaded portion (not shown) which couple to the threaded holes 12 of the rack 10. These knurled knobs 22A–D, and many other devices familiar to one having ordinary skill in the art, hold the chassis 20 within the rack 10. Each chassis 20 of the preferred embodiment is constructed such that a plurality of servers may be installed therein. Referring still to FIG. 2, the chassis 20 is preferably adapted to hold the servers 30 in a vertical position. While only three such servers are shown in FIG. 2, in the preferred embodiment each chassis 20 is adapted to hold eight servers 30. Further, each chassis 20 is also adapted to hold various communication modules which allow the servers 30 within the chassis 20 to communicate with each other and to external systems and devices.

Figure 3:
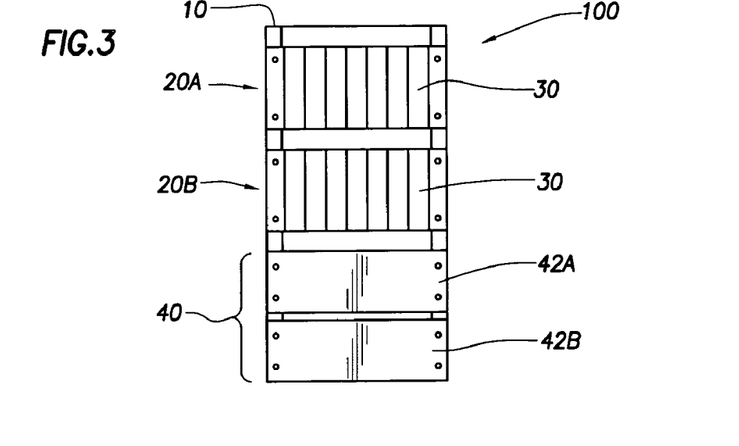
FIG. 3 shows a front elevational view of a rack mounted server system having two chassis and two power supply assemblies.

FIG. 3 shows a front view of a rack mounted server system 100 of the preferred embodiment. In particular, FIG. 3 shows two chassis 20A and 20B mounted within the rack 10. Each chassis preferably houses a plurality of servers 30. While any number of chassis 20 may be used in a server system 100, the preferred embodiment envisions having at least one, and no more than six chassis 20 in any one system.

As mentioned in the Background section, in order to place the preferred eight servers 30 within each chassis 20, preferably none of these servers 30 contain on-board AC to DC power supplies (but preferably do have DC to DC power supplies, which take up significantly less space). Rather, and still referring to FIG. 3, power is supplied for each server 30 in the server system 100 from a power supply system 40. In the preferred embodiment, the power supply system 40 comprises two power supply assemblies 42A, B. The number of power supply assemblies 42 required for any particular server system 100 will be dependent upon the number of chassis 20 and the number of servers 30 within those chassis. For a server system 100 having six such chassis with each chassis preferably housing eight servers 30, preferably two power supply assemblies 42A, B are required. If more chassis are added, more power supply assemblies 42 may be required. Likewise, if fewer chassis are used, and therefore fewer servers 30 are used, it is possible that the power supply system 40 may include only a single power supply assembly 42.

Figure 4:
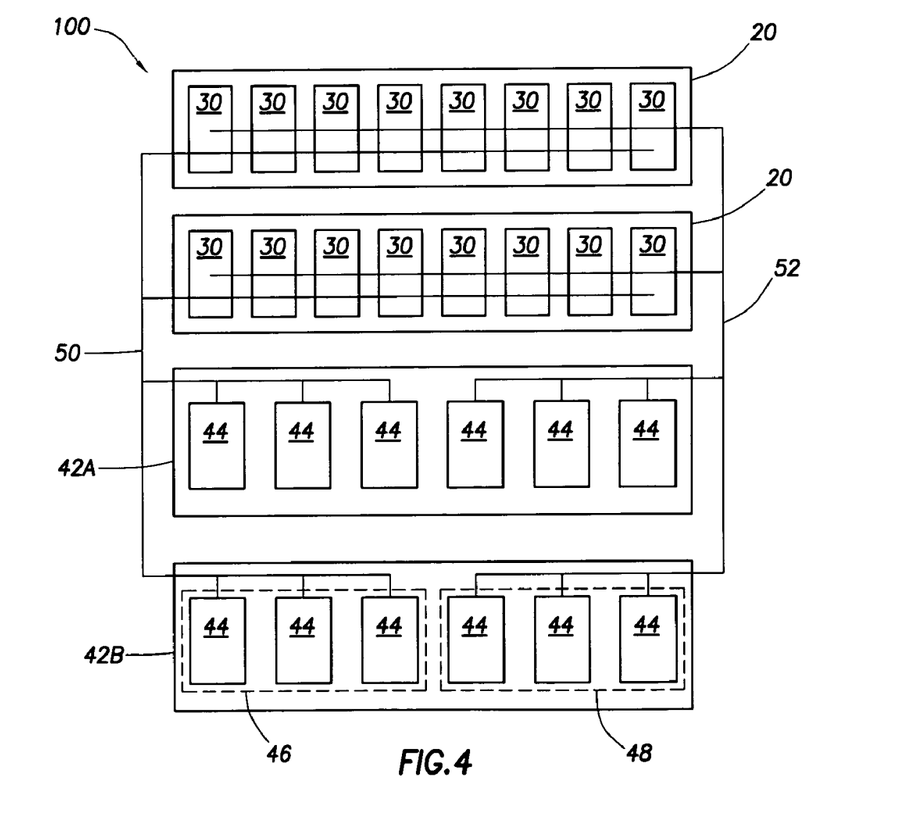
FIG. 4 shows an electrical block diagram of power distribution in the server system of the preferred embodiment.

FIG. 4 shows an electrical schematic for power distribution in a server system 100 of the preferred embodiment. Preferably, each power supply assembly 42 comprises a plurality of individual power supplies 44, and in the preferred embodiment, each power supply assembly 42 has six such individual power supplies 44. Preferably, the individual power supplies 44 within a power supply assembly 42 are divided into two banks 46 and 48 (the banks 46 and 48 are shown only on power supply assembly 42B, but are equally applicable to all power supply assemblies). The individual power supplies 44 in each bank 46, 48 then place their power on respective power supply rails 50 and 52.

In the rack mounted server system 100 of the preferred embodiment, the power supply rails 50, 52 are fully redundant supplies to the servers 30 in the chassis 20. In other words, the bank 46 of the power supply assemblies 42 that feed a particular rail are preferably capable of supplying all the necessary power to operate the server system 100. Likewise, the second bank 48 of the power supply assemblies 42 are also preferably adapted to supply all the necessary power to operate the server system 100. In this way, the power supplies may be operated in a fully redundant fashion. FIG. 4 indicates this ability by showing that each server 30 is coupled to each power rail 50, 52. Thus, in the preferred embodiments, each set of servers 30 in each chassis 20 are preferably adapted to have the capability to take their full required operational power from either rail, thus implementing the fall power supply redundancy of the preferred embodiment. FIG. 4 however does not indicate any ability for the servers to communicate with the power supply system 40. Although it may be possible to operate a server system that has little or no communication between the power supply system in the servers themselves, the preferred embodiments of the present invention implements an intelligent allocation and de-allocation of power. This intelligent allocation and de-allocation requires some form of communication between the power supply system and the computers or servers.

Figure 5:
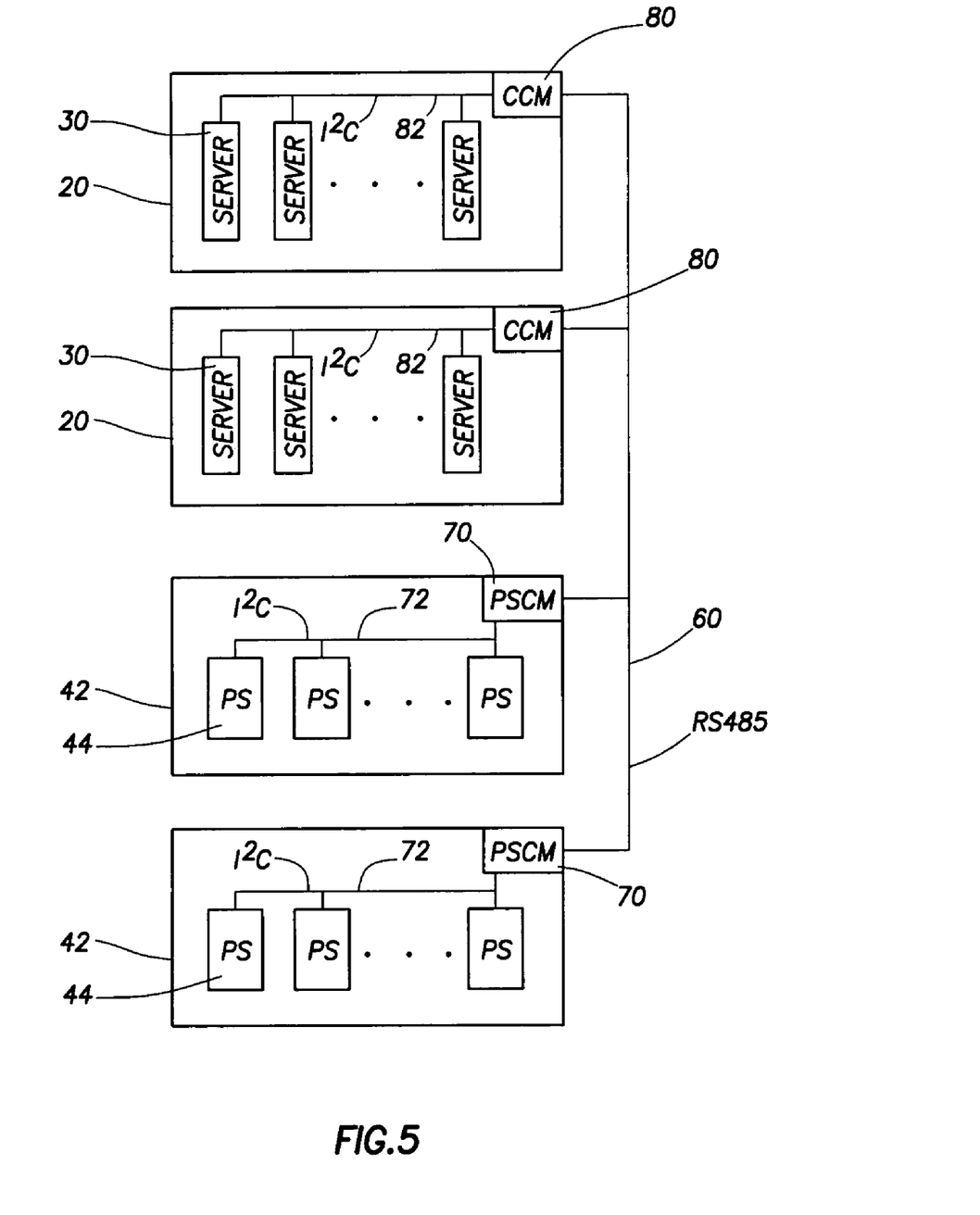
FIG. 5 shows an electrical block diagram of a power management system for the server system of the preferred embodiment.

FIG. 5 shows the preferred implementation of a power management system for a rack mounted server system, which allows various components associated with the servers 30 to communicate with the power supply assemblies 42. In particular, the preferred embodiment implements a serial communication pathway 60 coupling each of the power supply assemblies 42 and each chassis 20. This serial communication pathway 60 preferably comprises an Institute of Electrical and Electronic Engineers (IEEE) RS-485 compliant system. However, while the RS-485 system is preferred, communication between the power supply assemblies 42 and the servers 30 within the chassis 20 may take place by any suitable serial or parallel common communication bus and protocol. Although it may be possible to have each server 30 and each power supply 44 in the server system 100 communicate over the serial communication pathway 60, this is impractical. In the preferred embodiment there may be up to six chassis 20, each housing eight servers 30. Thus, there may be as many as forty-eight individual servers 30 in the system. Further, the preferred embodiment may comprise as many as two power supply assemblies 42, each having as many as six individual power supplies 44 for a total of twelve individual power supplies 44. In such a system, allowing each individual device to communicate on the serial communication pathway 60, as many as sixty individual devices would be vying for and arbitrating for the ability to communicate thereon. Additional problems would ensue in such a system in designating a particular primary or other device to make decisions regarding allocation and de-allocation of power.

Rather than allowing each individual server 30 and power supply 44 to communicate on the serial communication pathway 60, the preferred embodiment implements a plurality of communication modules. In particular, and still referring to FIG. 5, each of the power system assemblies 42, and each of the chassis 20, preferably have a communication module that is responsible for relaying messages to the serial communication pathway 60, and making decisions regarding the allocation and de-allocation of power. More particularly still, each power system assembly 42 preferably comprises a power supply communication module 70 (PSCM) mounted proximate to its respective power system assembly 42. In the preferred embodiment, each power system communication module 70 is mounted on or near a backplane board of each respective power system assembly 42.

In broad terms, a power supply communication module 70 is responsible for communicating with each individual power supply 44 in its respective power supply assembly 42 to determine parameters of each individual power supply 44 such as fan operability, the internal temperature of the power supply, the power supply input power (incoming AC power), output current, and output amps. The power supply communication module is also responsible for monitoring power supply assembly 42 level parameters such as operability of external fans, temperature of the operating environment, and power loading of the system. Knowing these parameters is important in implementing the intelligent allocation and de-allocation of power for the entire rack mounted server system 100.

In the preferred embodiment, the power supply communication module 70 is also preferably capable of communication across the serial communication pathway 60 to other power supply communication modules and other chassis communication modules 80 (discussed below). Each power supply communication module 70 communicates with the individual power supplies 44 in the particular power system assembly 42 by means of a I$^2$C bus 72. The I$^2$C bus is a dual line, multidrop serial bus developed by Philips Semiconductors that comprises a clock line and one data line. The devices connected to the I$^2$C bus can act as either primary or secondary devices (or alternatively master or slave respectively), and each device is software addressable by a unique address. Primary devices can operate as transmitters, receivers, or combination transmitter/receivers to initiate 8-bit data transfers between devices on the bus. The I$^2$C utilizes arbitration to prevent data corruption when two or more master or primary devices desire simultaneously transfer data. Details regarding the I$^2$C bus may be found in "The I$^2$C-Bus Specification," Version 2.1 (January 2000), authored by Philips Semiconductors®. Although the I$^2$C bus is the preferred communication pathway between the individual power supplies 44 and the power supply communication module 70, substantially any serial or parallel communication system and protocol would be operable.

Still referring to FIG. 5, much like the power supply assemblies 42, each chassis 20 preferably comprises a chassis communication module 80 (CCM). The chassis communication module 80 preferably communicates with each server 30 within its particular chassis 20, and preferably relays messages as necessary to and from the serial communication pathway 60. The chassis communication module 80 is not only adapted to communicate using the preferred RS-485 on the serial communication pathway 60, but also preferably communicates to each individual server 30 within its chassis 20 by means of an I$^2$C serial communication pathway 82. While the I$^2$C communication pathway 82 is preferred, any suitable communication system and protocol may be used to facilitate the communication.

Figure 6:
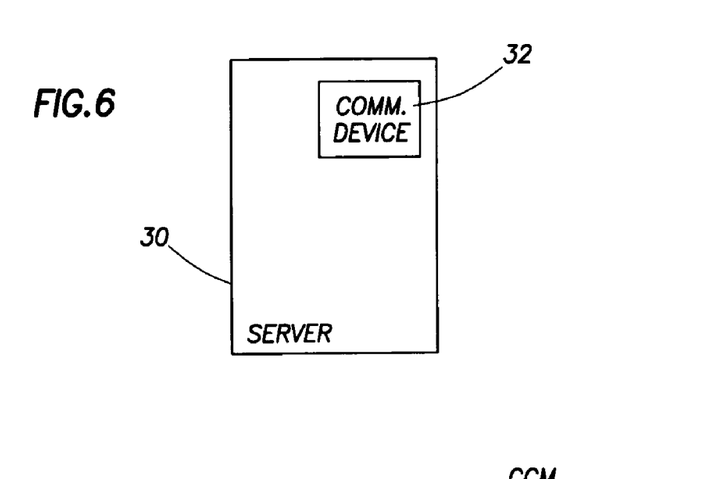
FIG. 6 shows an electrical block diagram of a server 30.

FIG. 6 shows a partial electrical block diagram of a server 30. The server is preferably a computer system having one or more microprocessors and other devices required for normal computer system operation, but the server 30 preferably does not include a power supply for converting AC power to DC power. However, the server 30 preferably does comprise a DC-DC power supply to convert the preferred −48 volt DC power supplied from the power supply system 40 into the required operational voltages for the microprocessor and other sub-systems. Further, the server 30 also comprises a communication device 32 which is at least in part dedicated to communicating over the I²C bus 82 with the chassis communication module 80. As discussed more fully below, this communication device 32 preferably becomes operational just after the server 30 is placed within the chassis 20. That is, the communication device 32 is preferably powered and active before the remaining portions of the server 30 are allowed to power up. The communication device 32 functions may be implemented in any of an array of possible devices familiar to one of ordinary skill in the art. In the preferred embodiments of the present invention, however, the functions of the communication device 32 are implemented in an Application Specific Integrated Circuit (ASIC) along with other functions that are beyond the scope of this specification. The communication device 32 functions could, likewise, be implemented in a microcontroller programmed to perform such a task, or even in combinational logic.

Figure 7:
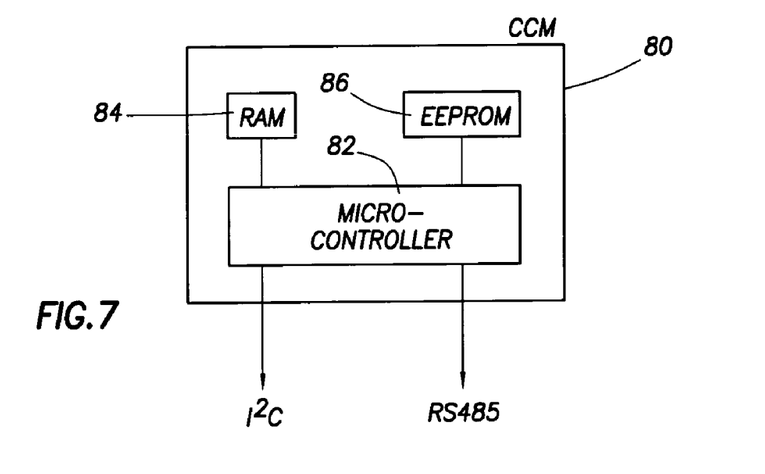
FIG. 7 shows an electrical block diagram of a chassis communication module of the preferred embodiment.

FIG. 7 shows a more detailed electrical block diagram of the chassis communication module 80 of the preferred embodiment. In particular, the chassis communication module 80 comprises a microcontroller 82, which is preferably a part No. ZIRCON-LH2 manufactured by Qlogic Corporation. This microcontroller 82 preferably has external RAM 84, which is the working area for the microcontroller 82. The microcontroller 82 also is preferably coupled to an external EEPROM 86 for semi-permanently storing programs and other data for use by the microcontroller. Preferably each of the chassis communication modules 80 are substantially the same, save their associations with different chassis 20. Although there is not a specific figure detailing the electrical components of each power supply communication module 70, it is envisioned that the hardware on each of these modules 70 will be substantially the same as a chassis communication module 80. Software executed by a microcontroller implementing the chassis communication module or the power supply communication module may differ given their duties in communicating with different devices. Further, in the preferred embodiments, the power supply communication modules 70 does not require a DC-DC power supply, as auxiliary 5 volt power is preferably available from the individual power supplies 44. The chassis communication modules 80, however, preferably have a DC-DC power supply capable of converting the preferred −48 volt DC supply into operable voltages for the on-board microcontroller and related circuitry.

Figure 8:
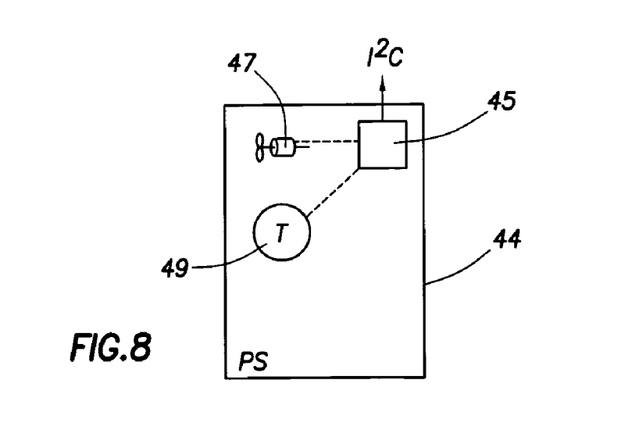
FIG. 8 shows an electrical block diagram of an individual power supply.

FIG. 8 shows a partial electrical block diagram of an individual power supply 44. Note that the figure only shows components related to the preferred embodiments—standard power supply components are omitted for the sake of clarity. Each power supply 44 preferably comprises a health and status monitoring device 45. As the name implies, the health and status monitoring device 45 is responsible for monitoring various parameters of the individual power supply 44 to which it is associated. In particular, the health and status monitoring device 45 preferably monitors any internal fans 47 of the power supply, the internal temperature 49 of the power supply 44, input power, output current, and output voltage. The health and status monitoring device 45 preferably communicates the gathered information to the power supply communication module 70 by way of the I²C bus.

The health and status monitoring device 45 may be as simple as combinational logic designed and constructed to implement the functions, but preferably is a microcontroller programmed to monitor the various parameters of the power supply 44 by way of input signals, and also programmed to communicate with the power supply communication module 70 over the I²C bus 72. If using combinational logic, the health and status monitoring device 45 may also require an interface circuit (not shown) to interface to the I²C bus 72. This interface could be a part no. PCF8575 I²C I/O expander manufactured by Phillips Semiconductor.

Having now described the underlying hardware associated with the intelligent power management for the rack of servers, attention is now turned to the preferred methods of allocating and de-allocating power in the rack mounted server system 100. For purposes of explanation, consider a rack mounted server system having a power supply system 40 with two power supply assemblies 42. Further, assume that each of the power supply assemblies 42 has the preferred six power supplies 44, in two banks 46, 48. Further assume that there are six chassis 20 within the rack mounted server system 100, but assume that no servers 30 have been installed therein. Thus, the individual power supplies 44 of the power supply assemblies 42 may communicate with their power supply communication module 70, and each power supply communication module 70 may communicate with the chassis communication modules 80, but no servers 30 have been installed.

Now assume that a single server 30 is inserted in a chassis 20. Upon insertion, the communication device 32 (see FIG. 6) of the server draws power from either or both of the power rails 50, 52. It must be understood, however, that the power drawn by the communication device 32 of the server is very small in comparison to the amount of power required to operate the server 30. It must further be understood that in the preferred embodiments the servers do not automatically begin their power-up sequence upon insertion into the chassis 20. Rather, the communication device 32, after itself being powered and operational, communicates to its respective chassis communication module 80, requesting permission to draw or allocate power from the power rails 50, 52. In the preferred embodiment, the communication device 32 within the server is aware of the total power a server requires. This knowledge on the part of the communication device may take many forms, but preferably the information is written to an EEPROM (not show) within the server 30. The communication device 32 refers to the number stored in the EEPROM, and includes that power amount in the request to the chassis communication module 80. The chassis communication module 80 relays the request to the primary of the two power supply communication modules 70 (determining which of the power supply communication modules 70 is the primary is discussed more fully below). The primary power supply communication module probes its power supplies 44 to make a determination as to available capacity. In the system assumed for purposes of discussion, the primary power supply communication module also asks the secondary power supply communication module to make a similar determination with respect to power capacity in its respective power supply assembly 42. If the primary power supply communication module determines that there is enough available capacity to supply the request, then a permission granted message is relayed back to the requesting chassis communication module 80, which in turn grants permission for the requesting server 30 to draw power and begin the boot process. Although the preferred embodiment for allocating power is described in the context of the plugging a first server 30 into a chassis 20, the operation is substantially the same for any power on operation. Consider a server 30 already installed in the chassis 20, but powered down. Any of a host of actions may precipitate powering of the server 30, e.g., pressing of a front panel power button, LAN based requests to power on, and/or activity that requires the server 30 to power on from a sleep state. Preferably the communication device 32 monitors these and any other parameter that may precipitate powering of the server 30, and prior to allowing the server 30 to allocate power, the communication devices requests permission to allocate power as described above.

For purposes of discussing release of power during normal operations, consider a chassis 20 substantially populated with servers 30, all drawing power from the power supply system 40. For any of a myriad of reasons, a server may be powered down. These reasons may include, but are not limited to, pressing of a power button on the server 30, performing a software shutdown, or abruptly removing the server 30. In the cases where an orderly shutdown is performed, e.g., pressing the power button and performing software shutdowns, the server 30, in particular the communication device 32, preferably communicates with its respective chassis communication module 80 that the power has been released. A similar situation arises where there a server 30 reduces power consumption, such as by entering a low power mode or sleep state. Thus, the release of power is then preferably communicated to the primary power supply communication module 70. If other servers 30 had previously been denied permission to power on for lack of available power, those servers 30 may now be granted permission. In the case where the server 30 is abruptly removed, the preferred communications may not take place; however, each chassis communication module 80 preferably monitors the presence of each server 30, and informs the primary power supply communication module 70 of the effective release of power.

Now assume either of the following: 1) that the chassis is substantially populated with servers 30, each server operating and drawing substantial amounts of power, the demand approaching the total capacity of the power supply system 40; or 2) malfunctions of individual power supplies 44 within each power supply assembly 42 have limited the capacity of the overall power supply system 40. Now assume that another server 30 is inserted into a chassis 20 of the rack mounted server system 100. As described before, the communication device 32 of the server 30 powers up (again a minimal amount of power) and requests permission to power up the individual server. The request to draw power from one of the power rails 50, 52 is relayed as discussed above to the primary power supply communication module which makes the determination, as before, as to available power. However, in the assumption of this case, there is not enough available capacity in the power supply system 40 to supply the requesting server 30. In this circumstance, the preferred embodiment relays a denial of the request back to the requesting server 30 by way of its respective chassis communication module 80, and thus the server preferably does not power on.

It must be understood that while certain assumptions were made as part of the explanation of the intelligent power allocation, many circumstances may arise when a server 30 is not allowed to draw power from the power rails 50, 52. Further, the discussion above indicates that the decision to grant or deny a particular server to draw power from the power rails was based on a desired operating condition, such as capacity. However, this may not be overall capacity, but preferably is a determination based upon retaining necessary power for full redundancy. That is, while the power supply system 40 may have had the necessary capacity to supply the particular requesting server, the primary power supply communication module 70 may be programmed to not allow allocation of power beyond that which would jeopardize the power supply system's 40 ability to fully supply necessary power to the rack mounted server system 100 from either of the power rails 50, 52. Allocating power to maintain fall redundancy is the preferred implementation, but it is certainly not required. If so desired, the system may operate in a state where full redundancy is not maintained.

For purposes of discussing intelligent de-allocation of power in a server system 100 of the preferred embodiment, consider a system having a plurality of chassis 20, each chassis having a plurality of server systems 30, and the system also having a power supply system 40 operating on the brink of its capacity (whether that is total capacity or capacity with regard to insuring full redundancy). Further, assume that an operational problem develops in one of the individual power supplies 44 of the power supply system 40. While the loss of an individual power supply may not result in the loss of any of the servers 30 in the system because of redundancy, the power redundancy in the situation may be lost. In the preferred embodiment, the primary power supply communication module 70 is informed of the loss (either by direct communication across its respective $I^2C$ bus from a power supply 44, or if the failure was in the power supply assembly associated with the secondary power supply communication module 70, by communication from the secondary power supply communication). Once the primary power supply communication module determines the desired operational limits have been exceeded, the power supply communication module preferably requests that individual servers 30 power down to reduce power load. This requesting and powering down of servers 30 preferably continues until the desired operating condition has been restored. Through substantially the same process, servers may again allocate power and become operational once power capacity is restored.

Although each server 30 within a rack mounted server system 100 is substantially identical at the hardware level to the other servers 30 in the system, some servers may be more critical to the particular operation. Consider an electronic commerce (e-commerce) site. In such a system, it may be that only a small number of the individual servers 30 are absolutely critical—servers containing the e-commerce database. The remaining servers 30 in the rack mounted server system 100 may be only responsible for servicing internet traffic. In this assumed circumstance, the few servers 30 that contain the actual e-commerce database are significantly more important to maintain an operational status than servers handling web traffic. In the preferred embodiment, the server system 100 is capable of intelligently de-allocating power, for example in emergency situations, from non-critical servers 44 before the critical servers are requested to shut down. In particular, in the preferred embodiment each server 30 in the rack mounted server system 100 is assigned a priority number. Thus, if there are six individual chassis 20 within the rack mounted server system 100, each chassis having eight servers 30 mounted therein, then 48 total levels of priority will be distributed among the 48 servers. In the event of a malfunction or failure of the power supply system 40, the primary power supply communication module 70 requests a power or shut down of the lowest priority server. After this server is shut down and its power requirements returned to the pool, the primary power supply communication module 70 again analyzes the power requirements and may again request the next priority level server to be shut down. This procedure continues until enough servers 30 have been shut down to restore the rack mounted computer system into its desired state of operation. It must be remembered that the shutting down of servers may be to ensure that there is enough power to operate them at all, or it may be to ensure that fall redundancy of the power supplies is maintained. It must be understood, however, that while the method described above is the preferred way to implement the intelligent power de-allocation, there are many equivalent ways of performing this task. For example, each chassis communication module may be programmed to know the relative importance of each server 30 within its respective chassis 20. Equivalently, the power supply communication module may be programmed with this information and thus may request particular servers to be shut down. One of ordinary skill in the art, now understanding the objectives of the intelligent power de-allocation, could devise many structures and methods to perform this task.

Figure 9:
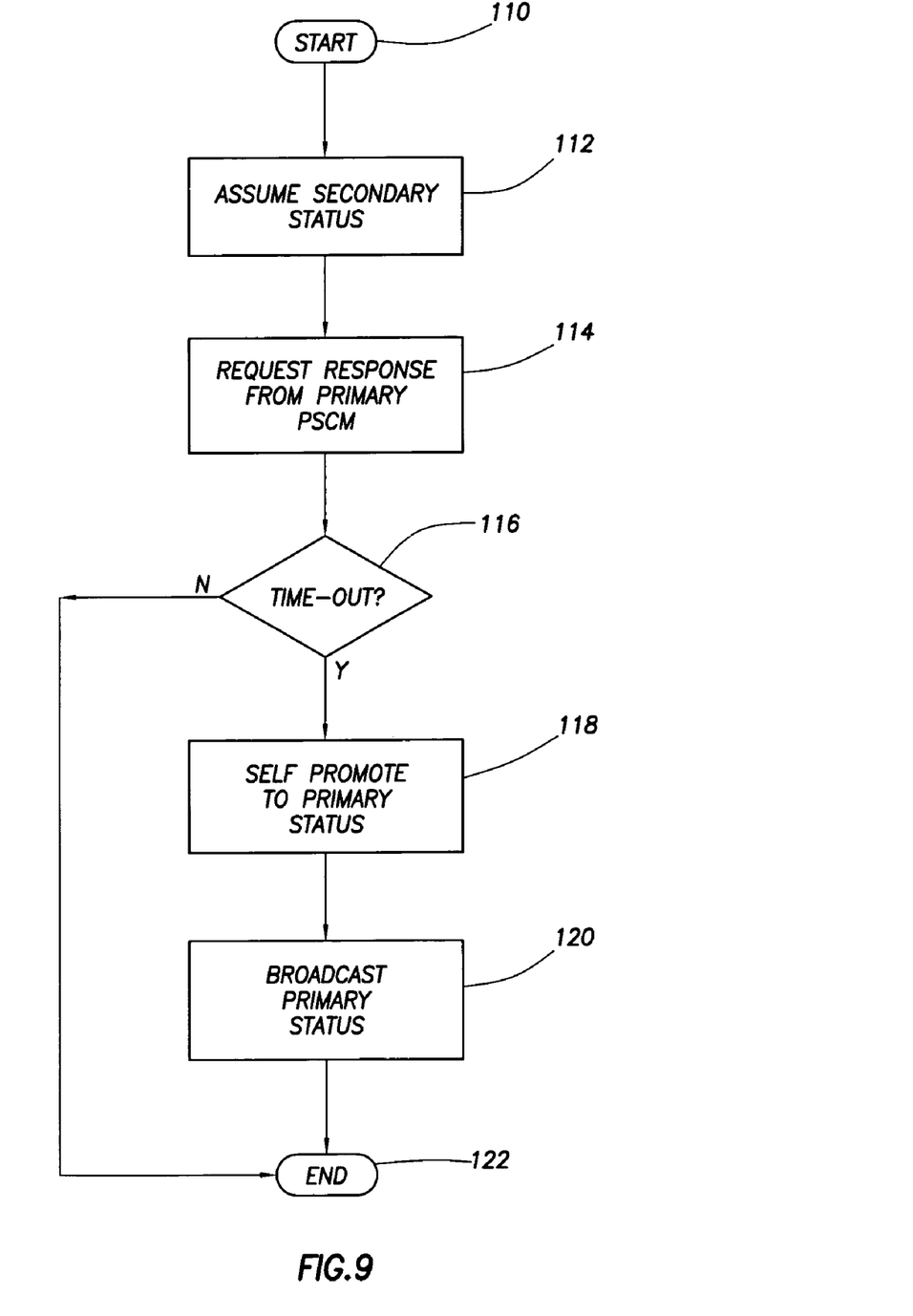
FIG. 9 shows a flow diagram for determining the primary power supply communication module of the preferred embodiment.

As discussed above, in the preferred embodiment, only one of the power supply communication modules 70 is designated as primary, and the second is designated as a secondary. While it may be possible to hardwire or hardcode this primary and secondary relationship, in the preferred embodiment each of the power supply communication modules 70 is capable of taking on the primary responsibility. Thus, if one power supply communication module 70 is lost due to hardware or communication problems, the second power supply communication module 70 may take over that primary responsibility. However, having the plurality of power supply communication modules 70 in the system each having the capability to be the primary requires some method to select a primary as between competing modules. Consider, for purposes of explanation, the initial power-up of a rack mounted server system 100. Upon the initial application of power from the power supply system 40, each power supply communication module 70 becomes operational. FIG. 9 shows a preferred start-up sequence of each of the power supply communication modules 70 with respect to determining the primary power supply communication module 70 of the particular rack mounted computer system 100. In particular, each power supply communication module preferably starts this process as indicated in block 110 and then immediately assumes a secondary status as indicated by block 12. After assuming a secondary status, the communication module 70 requests a response from the primary power supply communication module as indicated in block 114. In the condition where a power supply communication module has been replaced or is otherwise restarted separate and apart from other power supply communication modules, a primary will already be assigned and thus a response could be expected. However, in the situation where each power supply communication module 70 is starting its sequence substantially simultaneously, there may not be a primary to respond to the request indicated in block 114. Thus, preferably a timer is started, and the path taken is dependant upon whether a response from a primary power supply communication is received before the timer runs out as indicated in block 116. If no response is received before a time out of the timer, the power supply communication module 70 preferably self-promotes to the primary status as indicated in block 118. After self-promoting to primary, the power supply communication module then broadcasts its primary status as indicated in block 120. This broadcast is preferably not only to other power supply communication modules, but also to chassis communication modules 80 in the system. In this way, each communication module in the system is aware of which power supply communication module is primary. All communications from the chassis communication modules 80 are thereafter directed to the primary power supply communication module (unless that primary status changes for some reason).

In the situation however where there is already a primary power supply communication module 70, the length of the timer is preferably set longer than the amount of time it may take that primary to respond. Thus, if a response is received before a time out of the timer as indicated in block 116, the particular power supply communication module remains in its secondary status. The flow diagram indicates this feature by having the process move from block 116 to the end block 122.

Because power supply communication modules 70 of the preferred embodiment communicate with each other across the RS-485 bus, the determination as to which module will be the primary module is effectively determined as of the time one of these modules wins arbitration on the RS-485 bus to request a response from the primary, as indicated in block 114. Thus, in the preferred embodiments, there is no chance that two power supply communication modules will simultaneously self-promote. However, if the serial communication pathway 60 is changed such that multiple simultaneous communication may occur, there may have to be other mechanisms for determining which power supply communication module should be the primary, for example, choosing a primary based upon the highest assigned physical address, or the like.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
   requesting permission by a server in a rack mounted server system to allocate power from a central power supply;
   polling individual power supplies in the central power supply to determine remaining power capacity of each individual power supply, and there from determining a capability of the central power supply;
   analyzing power requirements of the server requesting allocation against the capability of the central power supply; and
   powering the server if power is available from the central power supply to maintain fully redundant capability from the central power supply.

2. The method of allocating power as defined in claim 1 wherein requesting permission further comprises:
   sending a request by the server to the central power supply across a primary communication pathway; and
   responding by the central power supply across the communication pathway.

3. The method of allocating power as defined in claim 2 wherein sending the request and responding across a communication pathway further comprises sending the request and responding across a serial communication pathway.

4. The method of a locating power as defined in claim 3 wherein sending the request and responding across a serial communication pathway further comprises sending the request and responding across an RS-485 serial communication pathway.

5. The method of allocating power as defined in claim 2 wherein requesting permission further comprises:
sending the request by the server across a first communication pathway to a chassis communication module;
relaying the request by the chassis communication module to a power supply communication module across the primary communication pathway; and
responding by the power supply communication module with a response being one of permission granted and permission denied to allocate power.

6. A power management system comprising:
a chassis communication module;
a power supply communication module;
a first communication pathway coupling the chassis communication module and the power supply communication module;
a second communication pathway configured to couple the chassis communication module to a plurality of servers;
a third communication pathway coupling a power supply system to the power supply communication module;
wherein a server of the plurality of servers sends a request for permission to allocate power from the power supply system across the second communication pathway to the chassis communication module;
wherein the chassis communication module relays the request for permission to the power supply communication module across the first communication pathway; and
wherein the power supply communication module polls the power supply system across the third communication pathway, receives results of that polling across the third communication pathway, and sends a response to the server across the first communication pathway, the response being one of permission granted or permission denied.

7. The power management system as defined in claim 6 wherein the chassis communication module further comprises:
a random access memory array (RAM);
a read only memory (ROM);
a microcontroller controller coupled to the RAM and ROM, the microcontroller executes programs stored on the ROM;
said microcontroller coupled to both the first and second communication pathways;
wherein the microcontroller receives the request for permission from the server across the second communication pathway and transit its that request for permission across the first communication pathway to the power supply communication module; and
wherein the microcontroller further receives the response across the first communication pathway from the power supply communication module and directs that response across the second communication pathway to the server.

8. The power management system as defined in claim 6 wherein the power supply communication module further comprises:
a random access memory array (RAM);
a read only memory (ROM);
a microcontroller controller coupled to the RAM and ROM, the microcontroller executes programs stored on the ROM;
said microcontroller coupled to both the first and third communication pathways;
wherein the microcontroller receives the request for permission across the first communication pathway, and in response to the received request for permission, polls the power supply system across the second communication pathway; and
wherein the microcontroller further receives results of the polling from the power supply system across the third communication pathway, and transmits the response to the server across the first communication pathway.

9. The power management system as defined in claim 6 wherein the first communication pathway further comprises a serial communication pathway.

10. The power management system as defined in claim 9 wherein the serial communication pathway further comprises an Institute for Electrical and Electronic Engineers (IEEE) RS-485 serial communication pathway.

11. The power management system as defined in claim 6 where the second communication pathway further comprises a serial communication pathway.

12. The power management system as defined in claim 11 wherein the second communication pathway further comprises an $I^2C$ bus.

13. The power management system as defined in claim 6 wherein the third communication pathway further comprises a serial communication pathway.

14. The power management system as defined in claim 13 wherein the third communication pathway further comprises an $I^2C$ bus.

15. A rack mounted computer system comprising:
a chassis housing a plurality of computers, the chassis mounted in the rack mounted system;
a central power supply system mounted in the rack mounted computer system, the central power supply system coupled to and supplying power to the plurality of computers, said central power supply system comprising a plurality of individual power supplies;
a chassis communication module coupled to the plurality of computers by way of a first communication pathway;
a power supply communication module coupled to the chassis communication module by way of a second communication pathway, and the power supply communication module coupled to each individual power supply by way of a third communication pathway;
wherein the plurality of computers request permission to draw power from the central power supply system by sending that request to the chassis communication module;
wherein the chassis communication module forwards each request for permission to draw power to the power supply communication module; and
wherein the power supply communication module generates a response to the request for permission to draw power by polling each individual power supply across the third communication pathway to determine remaining power capacity, the power supply communication module sending the response across the second communication pathway.

16. The rack mounted computer system as defined in claim 15 wherein the first communication pathway further comprises a serial communication pathway.

17. The rack mounted computer system as defined in claim 15 wherein the second and third communication pathways further comprise serial communication pathways.

18. The rack mounted computer system as defined in claim 17 wherein each of the second and third serial communication pathways further comprise an I²C bus.

19. A rack mounted computer system comprising:
a plurality of computers mounted in the rack mounted computer system;
a central power supply system mounted in the rack mounted computer system, the central power supply system coupled to and supplying power to the plurality of computers;
a first communication pathway coupled between the plurality of computers and the central power supply system;
a power supply communication module coupled to the plurality of computers across the first communication pathway, the power supply communication module also coupled to the central power supply system across a second communication pathway;
said central power supply further comprises:
a plurality of individual power supplies, each individual power supply having a health and status monitoring device associated therewith, each health and status monitoring device monitors an operating condition of its associated individual power supply; and
wherein each of said health and status monitoring devices communicates the operating condition of it associated individual power supply to the power supply communication module across the second communication pathway;
wherein the power supply communication module requests a non-critical computer of the plurality of computers to shut down when a health and status monitoring devices indicates a change in the operating condition of its associated individual power supply.

20. The rack mounted computer system as defined in claim 19 wherein the power supply communication module requests the non-critical computer of the plurality of computers to shut down when a first health and status monitoring device for a first individual power supply indicates a failure of the first individual power supply.

21. A rack mounted computer system comprising:
a plurality of computer means
a means for housing the plurality of computer means, the means for housing in the rack mounted system;
a central means for supplying power to the plurality of computer means, the central means for supplying mounted in the rack mounted computer system, the central means for supplying comprising a plurality of individual means for supplying power;
a first means for facilitating message transfer coupled to the plurality of computer means;
a means for computer communication coupled to the first means for facilitating;
a means for communicating with a power supply that transfers messages to the central means for supplying, the means for communication coupled to the means for computer communication though a second means for facilitating message transfer and coupled to each individual means for supplying power by way of the a third means for facilitating message transfer;
wherein each of the plurality of computer means requests permission to draw power from the central means for supplying by sending those requests to the means for computer communication across the first means for facilitating;
wherein the means for computer communication forwards each request for permission to draw power across the second means for facilitating to the means for communicating with a power supply; and
wherein the means for communicating with a power supply generates a response to the request for permission to draw power by polling each individual means for supplying power across the third means for facilitating to determine remaining power capacity, the means for communicating with a power supply sending the response across the second means for facilitating.

22. A rack mounted computer system comprising:
a plurality of computer means mounted in the rack mounted computer system;
a central means for supplying power to the plurality of computer means, the central means for supplying mounted in the rack mounted computer system;
a first means for facilitating message transfer between the plurality of computer means and the central means for supplying;
a means for communicating with a power supply facilitating message transfer from the plurality of computers to the means for supplying power, the means for communicating coupled to the plurality of computer means across the first means for facilitating, the means for communicating also coupled to the central means for supplying power across a second means for facilitating;
said central means for supplying power further comprises:
a plurality of individual power supply means, each individual power supply means having a means for monitoring an operating condition of each individual power supply means and
wherein each of said means for monitoring communicates the operating condition of its associated individual power supply means to the means for communicating across the second communication means;
wherein the means for communicating requests a non-critical computer means of the plurality of computer means to shut down when a means for monitoring indicates a change in the operating condition of its associated individual power supply means.

23. The rack mounted computer system as defined in claim 22 wherein the means for communicating requests the non-critical computer of the plurality of computers to shut down when a means for monitoring for a first individual power supply indicates a failure of the first individual power supply.

24. The method of allocating power in a rack mounted server system as defined in claim 1 wherein requesting permission by the server to allocate power further from the central power supply further comprises:
sending a request to allocate power; and
sending a number representing an amount of power requested.

25. The method of allocating power in a rack mounted server system as defined in claim 24 further comprising:
querying a read only memory device within the server to obtain the number representing an amount of power requested; and
sending the number representing an amount of power requested to the central power supply across a primary communication pathway.

26. The power management system as defined in claim 6 wherein the server is further configured to send a number representing an amount of power needed along with the request for permission.

27. The power management system as defined in claim 26 further comprising:
a read only memory device mounted in the server, the read only memory device storing the number representing an amount of power needed; and
wherein the server obtains the number representing an amount of power needed by accessing the read only memory device.

28. The power management system as defined in claim 27 wherein the read only memory device further comprises an electrically erasable programmable read only memory.

* * * * *

UNITED STATES PATENT AND TRADEMARK OFFICE
CERTIFICATE OF CORRECTION

PATENT NO. : 7,043,647 B2
APPLICATION NO. : 09/966180
DATED : May 9, 2006
INVENTOR(S) : Peter A. Hansen et al.

It is certified that error appears in the above-identified patent and that said Letters Patent is hereby corrected as shown below:

In column 2, line 34, delete "tum" and insert -- turn --, therefor.

In column 5, line 22, delete "fall" and insert -- full --, therefor.

In column 9, line 21, delete "performed," and insert -- perform, --, therefor.

In column 10, line 9, delete "fall" and insert -- full --, therefor.

In column 11, line 8, delete "fall" and insert -- full --, therefor.

In column 13, line 52, in Claim 7, delete "transit its" and insert -- transmits --, therefor.

In column 15, line 27, in Claim 19, after "condition of" delete "it" and insert -- its --, therefor.

In column 15, line 44, in Claim 21, after "means" insert -- , --.

In column 15, line 61, in Claim 21, delete "a" before "third".

Signed and Sealed this

Seventh Day of April, 2009

JOHN DOLL
*Acting Director of the United States Patent and Trademark Office*